US006157888A

United States Patent [19]

Suzio et al.

[11] Patent Number: 6,157,888

[45] Date of Patent: Dec. 5, 2000

[54] INPUT SMOOTHING METHOD AND APPARATUS FOR AN ELECTRONIC THROTTLE CONTROL SYSTEM

[75] Inventors: Paul Michael Suzio, Livonia; Liang Tang, Ann Arbor, both of Mich.; Chao Sen (Mark) Hsu, Pittsburgh, Pa.

[73] Assignee: Ford Global Technologies, Inc., Dearborn, Mich.

[21] Appl. No.: 09/246,425

[22] Filed: Feb. 8, 1999

[51] Int. Cl.[7] .............................. F02D 11/10; G05B 11/42

[52] U.S. Cl. ..................... 701/110; 123/399; 251/129.04; 318/600; 700/65; 700/72

[58] Field of Search .................................... 701/102, 110; 123/396, 399; 700/72, 56, 65; 318/600, 621; 251/129.04

[56] References Cited

U.S. PATENT DOCUMENTS

| | | | |
|---|---|---|---|
| 4,337,511 | 6/1982 | Schneider et al. . | |
| 4,598,370 | 7/1986 | Nakajima et al. . | |
| 4,650,020 | 3/1987 | Mizuno et al. . | |
| 4,893,243 | 1/1990 | Tada et al. . | |
| 4,914,595 | 4/1990 | Suzuki et al. . | |
| 4,926,334 | 5/1990 | Suzuki et al. . | |
| 5,155,687 | 10/1992 | Katayama . | |
| 5,260,876 | 11/1993 | Oo et al. . | |
| 5,329,455 | 7/1994 | Oo et al. . | |
| 5,646,850 | 7/1997 | Ishida et al. . | |
| 5,717,592 | 2/1998 | Oo et al. . | |
| 5,906,185 | 5/1999 | Ishida et al. | 123/399 |

*Primary Examiner*—Andrew M. Dolinar
*Attorney, Agent, or Firm*—Allan J. Lippa; Roger L. May

[57] ABSTRACT

A method and apparatus for smoothing a throttle plate position command prior to being used by a closed loop throttle control unit. The method sequentially indexes through a lookup table storing a series of values of a smoothing function at routine time intervals. The difference between the current throttle plate command and the received throttle plate command is multiplied by the value of the smoothing function indexed from the lookup table. The product is then added to a reference throttle plate position command to generate a series of smoothed throttle plate position commands applied to the throttle control unit which provides smoother operation.

22 Claims, 6 Drawing Sheets

| INDEX | TIME (ms) | Index_Size = 1 |
|---|---|---|
| 0 | 0 | 0.00 |
| 1 | 5 | 0.08 |
| 2 | 10 | 0.18 |
| 3 | 15 | 0.28 |
| 4 | 20 | 0.38 |
| 5 | 25 | 0.50 |
| 6 | 30 | 0.62 |
| 7 | 35 | 0.72 |
| 8 | 40 | 0.82 |
| 9 | 45 | 0.90 |
| 10 | 50 | 0.95 |
| 11 | 55 | 0.98 |
| 12 | 60 | 1.00 |
| 13 | 65 | 1.00 |
| 14 | 70 | 1.00 |
| 15 | 75 | 1.00 |
| 16 | 80 | 1.00 |

INPUT SMOOTHING METHOD AND APPARATUS FOR AN ELECTRONIC THROTTLE CONTROL SYSTEM

TECHNICAL FIELD

This invention is related to smoothing the inputs to a throttle plate position control system.

BACKGROUND OF THE INVENTION

In general, the prior art is related to the area of minimizing the vehicle speed overshoot/undershoot using vehicle speed control systems. The prior art falls into two categories: The first category is that of providing a method to adjust the control effort of the speed control actuator by modifying the control law as taught by Oo et al. in U.S. Pat. No. 5,329,455. The second category provides a method for establishing or modifying the vehicle speed target path as a function of some system state feedback or driver input as taught by Isheda et al. in U.S. Pat. No. 5,646,850. Various target path modification strategies have been employed in vehicle speed control applications such as taught by Nakajima et al. in U.S. Pat. No. 4,598,370.

In contrast to vehicle or engine speed control system, the invention is related to a smoothing algorithm for throttle control applications for internal combustion engines. This smoothing algorithm has a much broader scope than the cited vehicle speed control systems, since vehicle speed control is but one of the many functions implemented with a throttle control system.

The invention is a throttle plate smoothing function, implemented in an input smoothing module, in which a step command is reshaped to provide smoother operation.

DISCLOSURE OF THE INVENTION

A method and apparatus for smoothing a throttle position command received from an external source prior to being applied to an electronic throttle control to reduce tracking errors and reduce overshooting. The method includes detecting the difference between the current throttle plate position and a received throttle plate position command to generate a delta position command and then sequencing through a lookup table storing a predetermined number of values of a smoothing function. The lookup table is indexed at preselected intervals based on the size of the delta position command. Each of the values indexed in the lookup table is multiplied by the delta position command to generate a series of smoothing values which are individually added to the current throttle plate position to generate at the predetermined intervals a series of effective throttle plate position commands which provides smoother operation.

In the disclosed embodiment, the lookup table stores 16 values of the smoothing function and the lookup table is indexed at 5 millisecond intervals.

The input smoothing function process is executed by a programmed microprocessor.

One advantage of the method for smoothing input throttle plate commands according to the invention is that it provides smoother tracking of the positioning of the throttle plate while maintaining a fast response time.

Another advantage of the method is that it prevents the throttle plate from striking the closed throttle and wide open throttle position stops.

Still another advantage is that the controller only needs one set of gain constants and provides better performance.

Another advantage is that the incremental approach allows the designer to approach the controller design from a "small step" point of view.

Still another advantage is that the avoidance of the throttle plate striking the stops significantly reduces noise from the gears in the speed reduction geartrain of the motor.

Yet another advantage is that the reshaped initial portion of the smoothed throttle plate command signals improves initial throttle plate tracking response.

Yet another advantage is that the implementation allows the use of a less complex, slower and less costly microprocessor.

These and other advantages of the method and apparatus for input smoothing an input throttle plate command will become apparent from a reading of the detailed description in conjunction with the appended figures.

BEST MODE FOR CARRYING OUT THE INVENTION

The input smoothing reshapes the step input to a throttle control system. The reshaping or smoothing function f(t) needs to have the following characteristics:

$$f(t_f)=\theta_d$$

$$\dot{f}(t_f)=0 \text{ and}$$

$$\ddot{f}(t_f)=0$$

A function having these characteristics is:

$$f(t)=\theta_i+(\theta_d-\theta_i)*\text{input\_smoothing\_factor}\ (t)$$

where: $\theta_d$=desired final input command $\theta_i$=initial angle for reference $t_f$=time to reach the desired angle and input_smoothing_factor (t)=

$$\{10(t/t_f)^3-15(t/t_f)^4+6(t/t_f)^4\} \quad (1)$$

is the fractional value used to modify input command. To implement the above algorithm in the throttle control unit would require extensive processing time incomparable with the relative quick response time desired. The amount of multiplication and division required by the above polynomial would overburden a 16-bit microprocessor used in the current throttle control units and require a faster more expensive microprocessor.

Instead of using the above algorithm, it has been found that an equivalent result can be achieved using a lookup table containing the desired input smoothing factors. By changing the step size used to index the lookup table, the smoothing function can be reshaped very easily. This allows modification of the smoothing function based on the desired response time and behavior.

Figure 1:
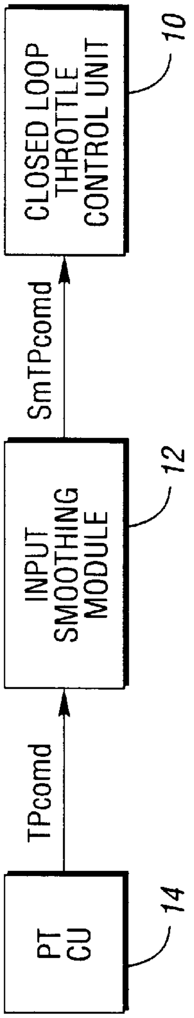
FIG. 1 is a block diagram of a throttle control system embodying the input smoothing module.

FIG. 1 is a block diagram of a throttle control system according to the invention. The system has a closed loop Throttle Control Unit (TCU) 10 which receives throttle plate command ($TP_{COMD}$) signals from a Powertrain Control Module (PCM) such as an electronic control unit or a cruise control module for an internal combustion engine. Interposed between the Throttle Control Unit 10 and the Powertrain Control Module 14 is an Input Smoothing Module (ISM) 12 which reshapes the throttle plate command signals according to the smoothing function to reduce tracking errors and overshooting. The Input Smoothing Module implements the smoothing function as shall be explained hereinafter. The Input Smoothing Module 12 converts the throttle plate command into a plurality of smoothed throttle plate commands based on the magnitude of the change in the throttle plate command as shall be discussed relative to the flow diagram shown on FIG. 4.

Figure 2:
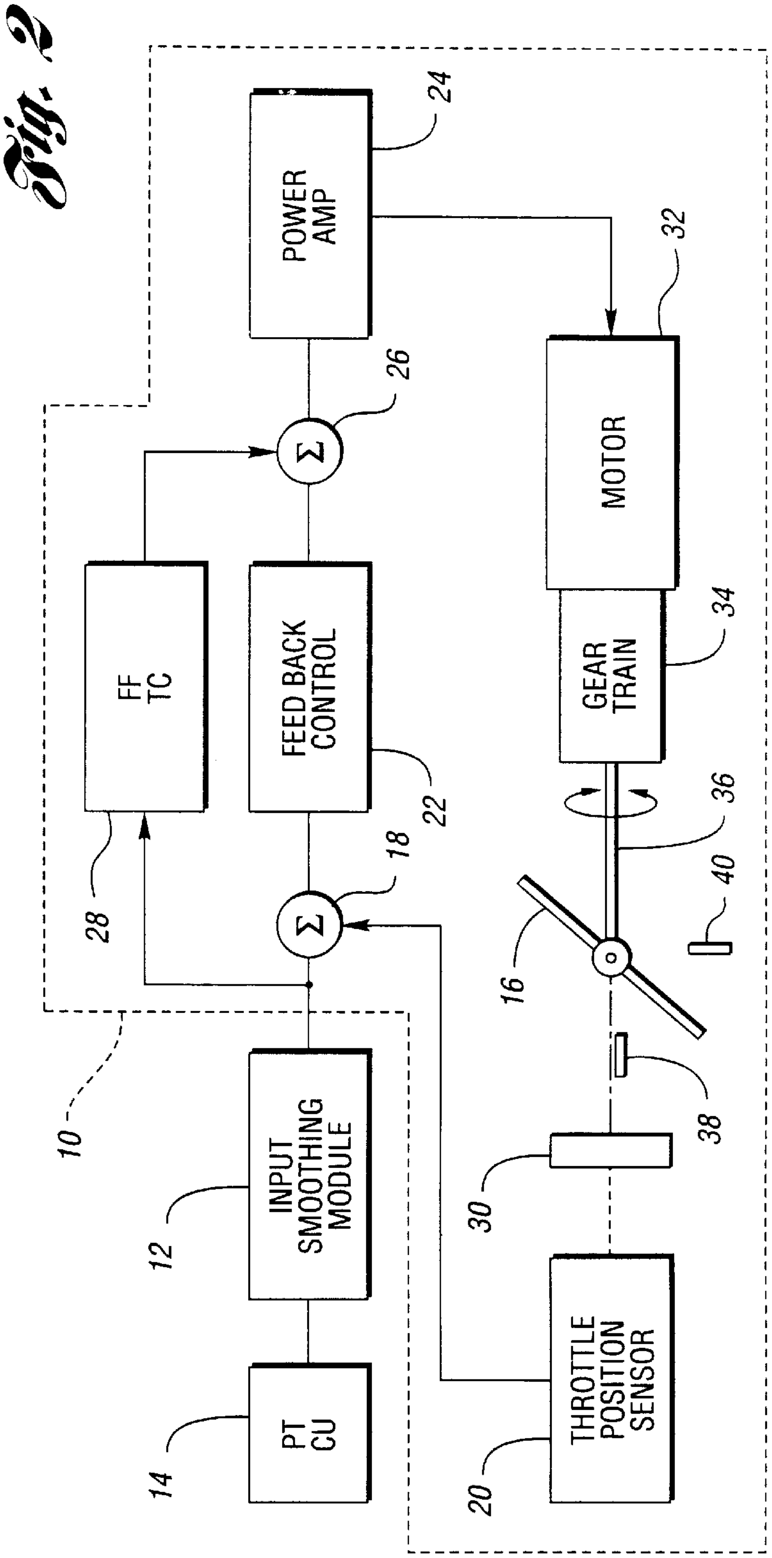
FIG. 2 is a block diagram showing the closed loop portion of the throttle control unit in greater detail.

FIG. 2 is a block diagram showing the structure of the closed loop Throttle Control Unit 10 in greater detail. As previously discussed, the Input Smoothing Module 12 receives throttle position commands from the Powertrain Control Module 14. The Input Smoothing Module converts the throttle plate command into a series of modified or effective throttle plate commands predetermined to smooth the positioning of the throttle plate with little or no overshoot in response to the commanded change in the throttle plate position.

The smoothed throttle plate commands from the Input Smoothing Module 12 are summed in a first summing junction with a feedback signal received from a throttle plate position sensor 20. The summed signal is received by a feedback controller 22 which converts the smoothed input commands into pulse modulated signals which are transmitted to power amplifiers 24 through a second summing junction 26. A feedforward torque control 28 produces a torque feedforward signal in response to the output of the throttle position sensor 20. The value of the feedforward signal is a function of a throttle plate position and counter balances the torque product by a return spring 30. The return spring resiliently biases the throttle plate 16 towards the closed position. The feedforward signal is summed with the output from the feedback control 22 in the second summing junction 26 and the summed signal is amplified in the power amplifier 24. The amplified signals output from the power amplifier 24 energize a variable speed reversible electric motor 32 having a reduction geartrain 34. The output shaft 36 of the reduction geartrain 34 is connected directly to the throttle plate 16, the return spring 30 and the throttle position sensor 20. The positioning of the throttle plate 16 is limited by an idle mechanical stop 38 and a wide open throttle mechanical stop 40 in a conventional manner.

One of the functions of the Input Smoothing Module 12 is to control the positioning of the throttle plate 16 such that the throttle plate when moved to the commanded position will not over shoot either a commanded idle position or a commanded wide open position forcibly engaging the idle and wide open throttle stops 38 and 40, respectively, producing objectionable noise from the gears in the geartrain 34.

Figure 3:
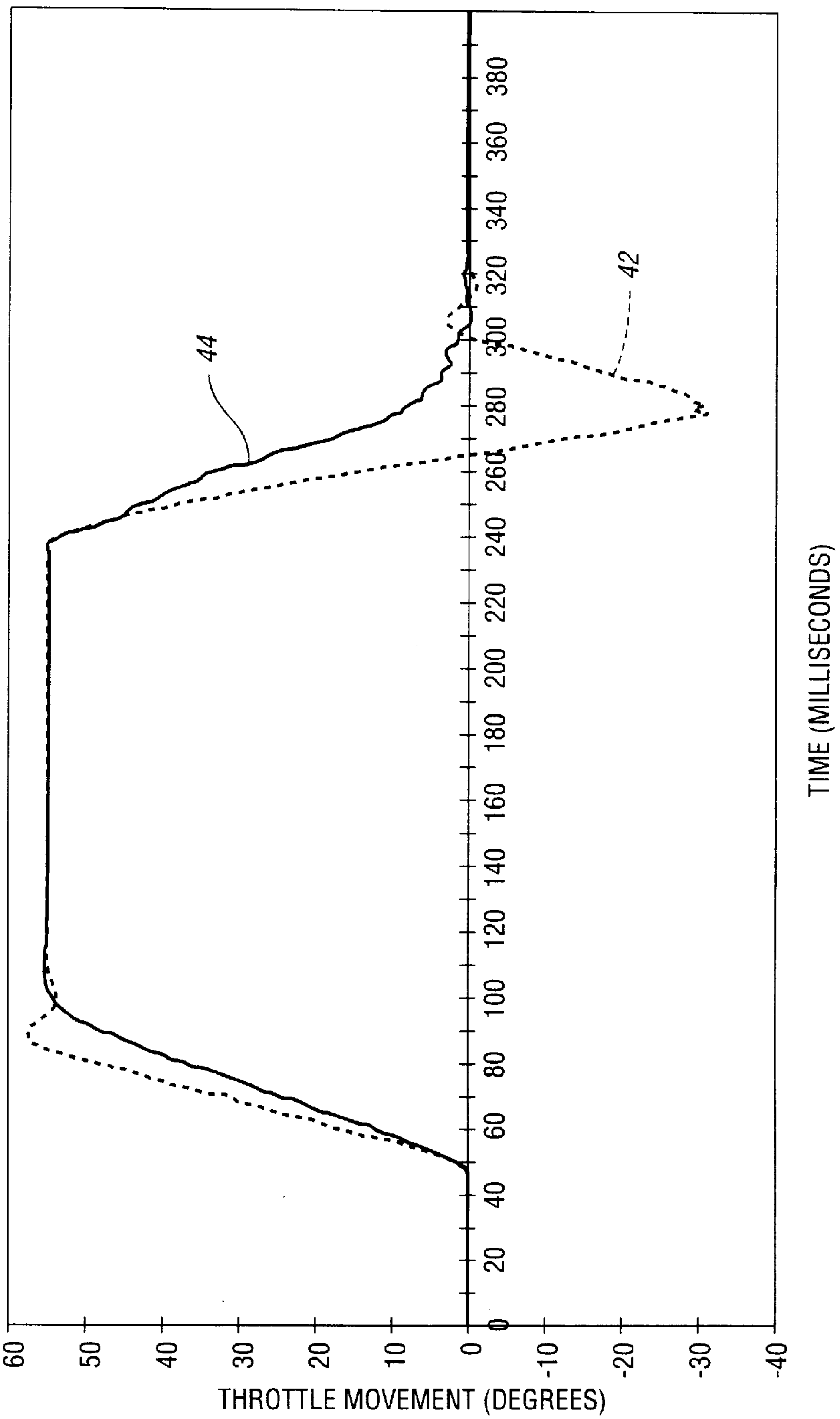
FIG. 3 is a graph showing the advantage of the input smoothing module in reducing over and under shooting.

FIG. 3 shows actual data of the positioning of the throttle plate 16 in response to a 55° commanded change in the throttle plate position. The dashed line 42 shows the actual position of the throttle plate as a function of time without the smoothing function performed by the Input Smoothing Module 12 while the solid line 44 shows the improvement using the smoothing function.

Figure 4:
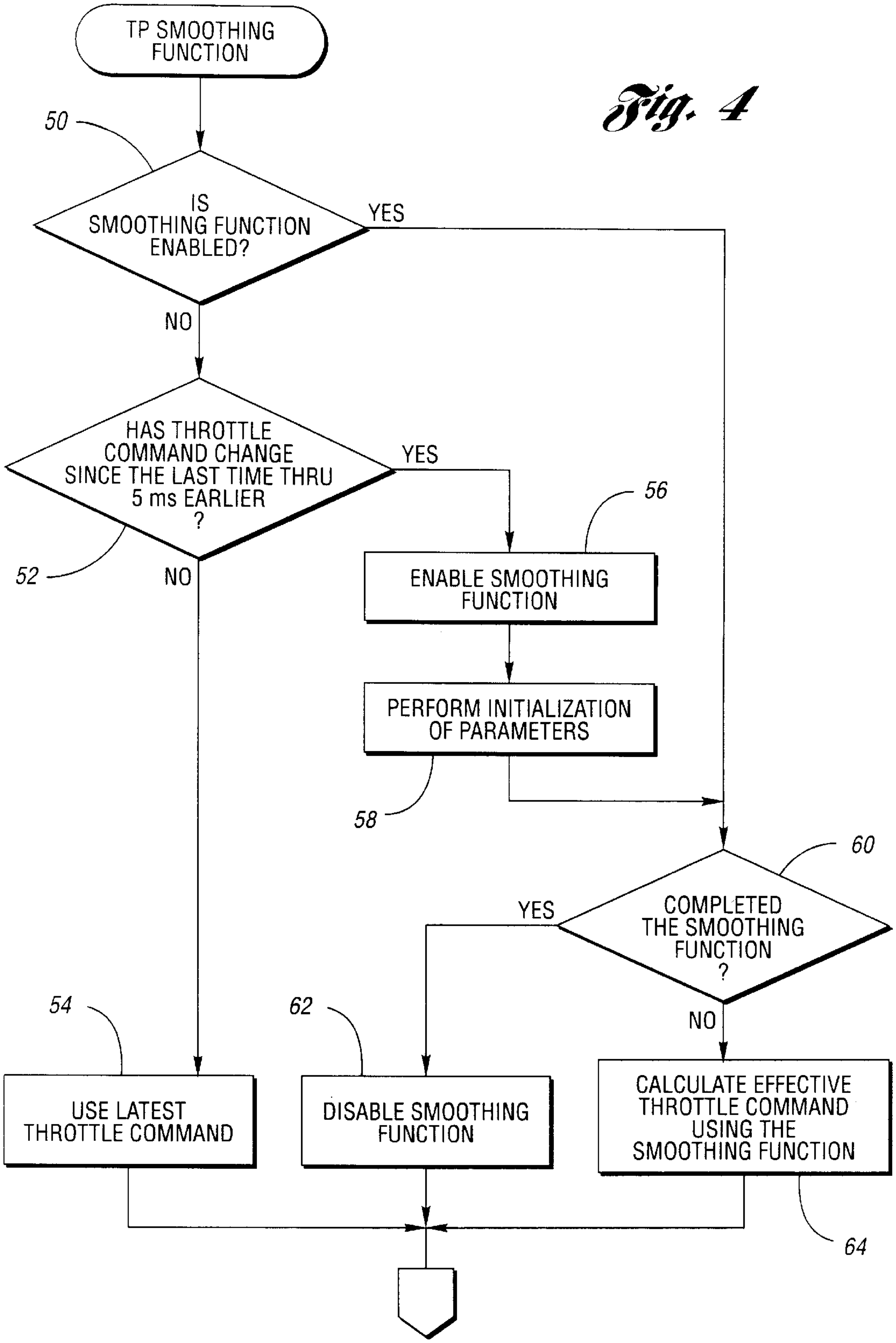
FIG. 4 is a basic flow diagram of the program executed by the input smoothing module.

FIG. 4 is a flow diagram of the program executed by the Input Smoothing Module 12. The program is executed at predetermined time intervals. The length of the predetermined time intervals is scaled with the response time of the system being controlled. For a fast response time, the predetermined time interval is preferably 5 milliseconds. The program begins by inquiring, in decision block 50, if the smoothing function is enabled. When the smoothing function is not enabled, the program will next inquire, decision block 52, if there has been a commanded significant change in the throttle plate position. When there has been no change or an insignificant change in the commanded throttle plate position, the program will use the latest throttle command, block 54, as the throttle plate command transmitted to the Throttle Control Unit 10.

Returning to decision block 52, when there is a significant change in the commanded throttle plate position, the program will enable the smoothing function, block 56, then proceed to initialize the parameters, block 58. After initializing the parameters, the program will inquire, decision block 60, if the smoothing process is completed. If the smoothing process is completed, the program will disable the smoothing function, block 62. Alternatively, if the smoothing process is not completed, the program will calculate the effective throttle position command using the smoothing function, block 64 and return to decision block 50 which will again inquire if the smoothing function is enabled. If the Smoothing was enabled by a prior iteration of the program, the program will go directly to decision block 60 and inquire if the smoothing process is completed. If it is, the program will disable the smoothing function, block 62. Alternatively, the program will once again calculate the effective throttle command using the smoothing function, block 64, then repeat.

Figure 5:
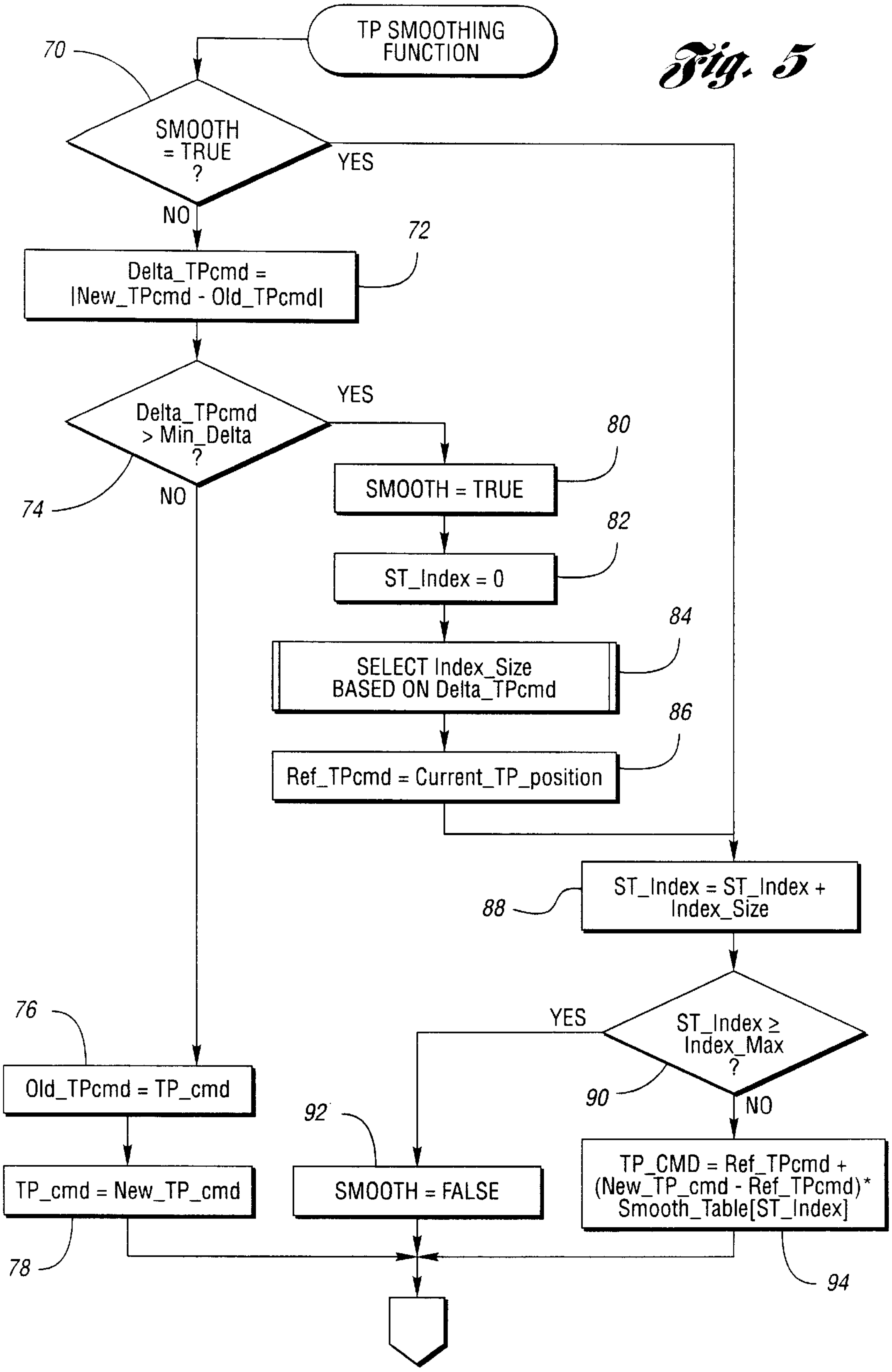
FIG. 5 is a more detailed flow diagram of the program executed by the input smoothing module.

FIG. 5 is a more detailed flow diagram of the routine executed by the Input Smoothing Module. The smoothing function begins by inquiring if the smoothing function flag is true (enabled), decision block 70. When not enabled, the program will calculate the change in the throttle position command, delta $TP_{COMD}$=New $TP_{COMD}$−Old $TP_{COMD}$, as indicated by block 72. The program will then inquire, decision block 74 if the commanded change in the throttle position, delta $TP_{COMD}$, is greater than a minimum delta value. The minimum value, min delta, is the value of any preselected small angle. In the illustrated example this minimum value corresponds to an angle of approximately 1°. If the commanded change in the throttle position is less than the minimum angle the program will proceed to set the old throttle plate position, old $TP_{COMD}$ equal to the new throttle plate position, new $TP_{COMD}$, block 76. The throttle plate position command which is now equal to the new throttle plate position command is transmitted directly to the closed loop Throttle Control Unit 10 and the program returns to decision 70.

However, if the commanded change in throttle position, delta $TP_{COMD}$, is greater than the minimum delta TPcoml, the program will proceed to enable the smoothing function flag, Smooth=true, block 80. The program will then initialize the pointer to the smoothing table by setting the index to 0, block 82 and select the index size based on the value of the commanded change in the throttle plate position, delta $TP_{COMD}$. The subroutine selection of the index size is discussed relative to the flow diagram shown on FIG. 7. Next the program will set a reference throttle command, Ref $TP_{COMD}$, equal to the current TP position as indicated by block 86 and then increment the smoothing table index, ST index equal to the current St index plus the index size, determined in block 84. After incrementing the smoothing table index, the program inquires, decision block 90, if the smoothing table index is greater than a maximum index which is a value greater than the maximum number of entries in the smoothing table illustrated in FIG. 6. The illustrated smoothing table will have a predetermined number of smoothing function entries. In the disclosed embodiment, there are 16 smoothing function entries; therefore, for this particular table, the maximum index, index max, would be 17. It is recognized that the smoothing table may have fewer or more than 16 smoothing function entries for any give throttle control system.

If the smoothing table index, ST index, is equal to or greater than index MAX the program will set the smoothing function flag to false, block 92 and return to decision block 70. Alternatively, the program will compute the effective or smoothed throttle plate command, $TP_{COMD}$, to be equal to the reference throttle plate command plus, the product of the difference between the new throttle plate command and the reference throttle plate command multiplied by the value of the entry indexed in the smoothing table, block 94 i.e. $TP_{COMD}$=Ref $TP_{COMD}$ (New $TP_{COMD}$−Ref $TP_{COMD}$)* smooth table (ST index). After calculating the value of the smoothed throttle plate command, the smoothed throttle plate command is transmitted to the closed loop Throttle Control Unit and the program will return to decision block 70 and repeat at the predetermined time intervals.

Returning to decision block 70, if the smoothing function flag is enabled, the program will increment the smoothing table index using the selected index size block 88 then inquire if the smoothing table index is greater than the maximum index, decision block 90. As before, if index is greater than the maximum index, the program will set the smoothing function flag to false, block 92 and return to decision 70. In response to the smoothing table index being less than the maximum index, the program will compute the effective or smoothed throttle plate position command, block 94, communicate the smoothed throttle plate command to the closed loop Throttle Control Unit 10 and return to decision block 70.

Figures 6, 7:
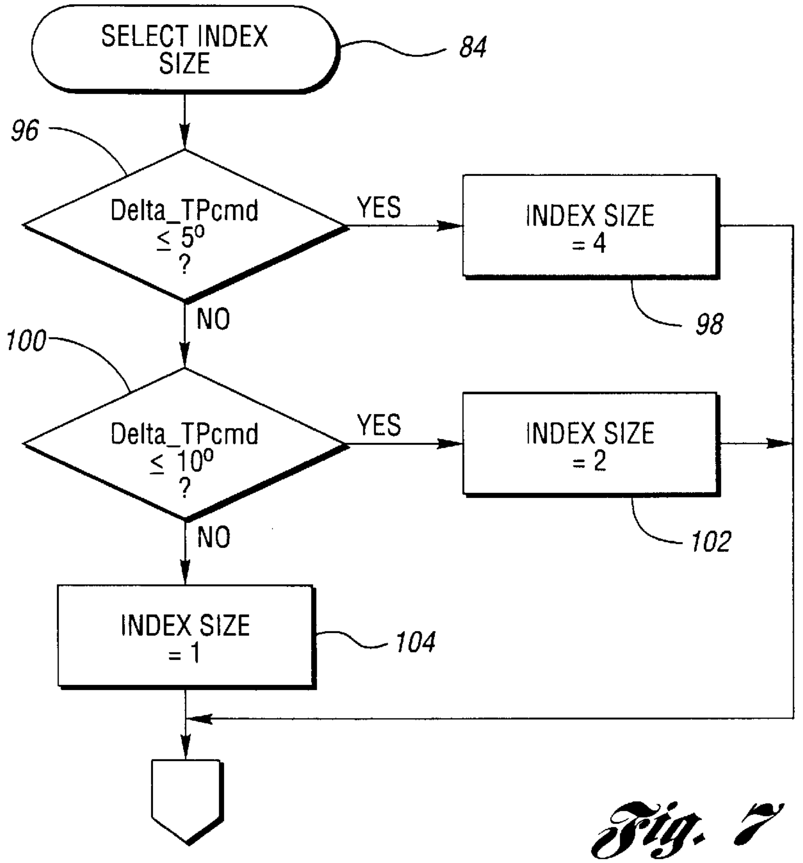
FIG. 6 is the lookup table storing the input smoothing function.
FIG. 7 is a flow diagram of the subroutine for selecting the index size.

FIG. 7 is a flow diagram of the subroutine indicated by block 84 entitled select the index size, discussed relative to the flow diagram shown on FIG. 5. The subroutine 84 first inquires, decision block 96, if the delta $TP_{COMD}$ is less than 5°. If it is the subroutine sets the size of the index to 4 as indicated in block 98. It is to be remembered that when delta $TP_{COMD}$ is equal to or less than 1°, decision block 74, the smoothing function is not enabled, therefore the index size is set to 4 when the data $TP_{COMD}$ is between 1° and 5°. If the delta $TP_{COMD}$ is greater than 5°, the subroutine proceeds to inquire, decision block 100 of the delta $TP_{COMD}$ is less than 10°. If so the index size is 2 as indicated in block 102. Otherwise if the delta $TP_{COMD}$, is greater than 10°, the subroutine will set the index size to 1 as indicated by block 104.

Returning now to the lookup table shown on FIG. 6, the 16 entries are 16 values of the throttle plate smoothing function arranged in an increasing order of their values ranging from 0 to 16. Each value of the throttle plate smoothing function is associated with a respective index to the smoothing table. In calculating the smoothed $TP_{COMD}$ for a delta $TP_{COMD}$ greater than 10°, the 16 values of the smoothing table are sequentially indexed to sequentially extract the 16 values of the smoothing function in a consecutive order. As indicated relative to block 64 of the flow diagram shown on FIG. 4, the smoothed $TP_{COMD}$ is calculated as follows:

$$TP_{COMD}=\text{Ref } TP_{COMD}+(\text{New } TP_{COMD}-\text{Ref } TP_{COMD})$$

times the value indexed from the smoothing table.

As discussed previously the smoothing table is indexed by a number equal to the current index plus the index size. For delta TP greater than 10°, every value in the smoothing table will be indexed. Therefore, for a delta TP between 5° and 10°, every other value in the smoothing table will be consecutively indexed. For a delta TP between 1° and 5°, every fourth value in the smoothing table will be indexed during subsequent iterations of the smoothing program when enabled.

Figure 8:
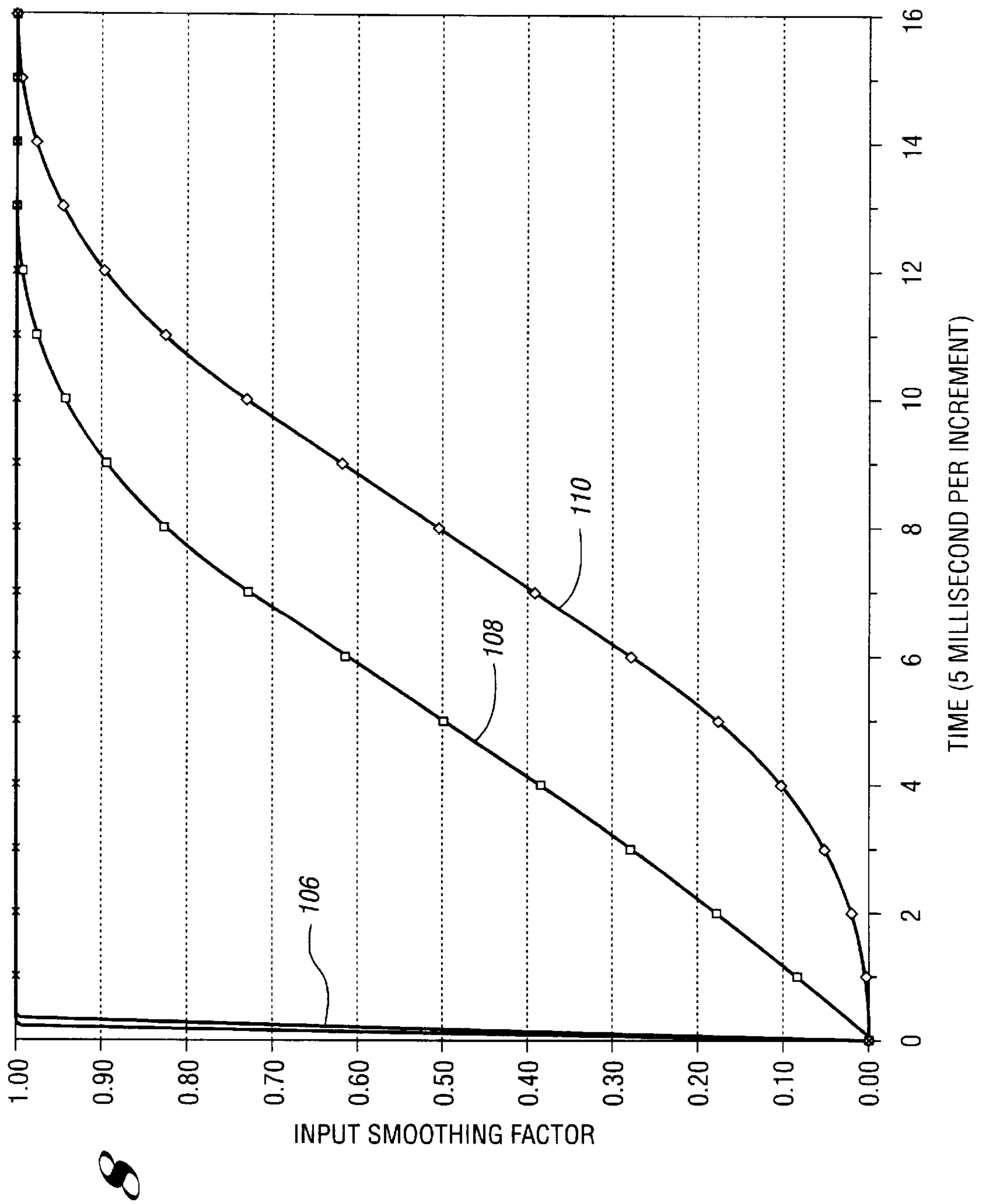
FIG. 8 is a graph showing the difference between output of the input smoothing module and a typical control system.

A novel feature of the smoothing function implemented by the Input Smoothing Module is illustrated by the graph shown in FIG. 8 Line 106 represents a commanded step change in the throttle plate position received from the Powertrain Control Module 14. Line 108 represents the series of effective or smoothed throttle plate commands output from the Input Smoothing Module 12. Line 110 represents a typical input smoothing function such as given by equation (1) previously discussed. As seen from FIG. 8, the initial portion of the smoothed (reshaped) throttle plate commands generated by the smoothing function embodied in the Input Smoothing Module 12 has a higher value than the commands generated according standard robotic smoothing functions. This results in improved initial throttle plate tracking response. Further, unlike traditional vehicle speed control systems which are based on feedback from one or more system state or inputs from the operator. The Input Smoothing Module 12 requires no feedback or driver inputs and relies solely on the change in the size of the throttle plate command received from the Powertrain Control Module and prior knowledge of the time required for the throttle plate to reach its target position.

While the best modes for carrying out the invention have been described in detail, those familiar with the art to which this invention relates will recognize various alternative designs and embodiments for practicing the invention as defined by the following claims.

What is claimed is:

1. A method for smoothing an input throttle plate position command comprising:

determining the difference between a received throttle plate position command and a current throttle plate position command to generate a difference value;

sequentially indexing through a lookup table storing a predetermined number of values of a smoothing function at predetermined intervals to generate a series of extracted values in response to the difference value being greater than a selected value;

multiplying the series of values, one at a time, with the difference value to generate a series of smoothing values; and adding the series of smoothing values, one at a time, to the current throttle plate position command to generate at the predetermined intervals a series of effective throttle plate position commands.

2. The method of claim 1 further including setting the current throttle plate position command equal to the input throttle plate command in response to the difference value being less than a selected angle.

3. The method of claim 2 further includes setting a smooth enable flag in response to the difference value being greater than the selected value and to disable the smoothing enable flag after indexing the last value in the lookup table.

4. The method of claim 3 further including selecting an index size in response to setting the smoothing enable flag, the index size indicating the manner in which the lookup table is indexed.

5. The method of claim 4 wherein selecting an index size comprises:

setting the index size to one in response to the difference value being indicative of an angle greater than a first predetermined angle;

setting the index size to two in response to the difference value being indicative of an angle between a second predetermined angle and the first predetermined angle; and setting the index size to four in response to the difference value being indicative of an angle between the second predetermined angle and the selected angle.

6. The method of claim 5 wherein the first predetermined angle is approximately 10 degrees, the second predetermined angle is approximately 5 degrees and the selected angle is approximately one degree.

7. The method of claim 5 wherein the sequentially indexing through the lookup table includes sequentially indexing through the lookup table by the index size.

8. The method of claim 7 further including the disabling of the smoothing enable flag in response to indexing through the predetermined number of values in the lookup table.

9. The method of claim 4 further including the detection of the enable smoothing flag being set to prohibit selecting of a new index size prior to completion of indexing through the lookup table.

10. The method of claim 1 wherein the predetermined number of values in the lookup table is 16.

11. The method of claim 10 wherein the predetermined number of values are arrange in an order of increasing magnitude.

12. The method of claim 1 wherein the predetermined intervals at which the lookup table is indexed is scaled to the response time of a system being controlled.

13. The method of claim 1 wherein the predetermined intervals at which the lookup table is indexed is approximately 5 milliseconds.

14. An input smoothing module for restructuring an input signal to minimizing tracking errors and overshoot comprising:

a lookup table storing a predetermined number of values of a smoothing function in a sequential increasing order of magnitude;

difference means calculating a delta position command indicative of the change between a commanded position, and a current position;

selection means selecting an index size based on the magnitude of the delta position command;

means for storing the current position command as a reference position command;

index means indexing the lookup table in accordance with the index size at preselected intervals;

multiplier means multiplying the delta position change by each value indexed in the lookup table to generate a series of smoothing values; and addition means adding each smoothing value to the reference position command to generate a series of expected position commands.

15. The input smoothing module of claim 14 wherein said difference means, selection means, index means, multiplier means and addition means are embodied in a programed microprocessor.

16. The input smoothing module of claim 15 wherein the input command is a throttle plate position command received from a powertrain control module and the series of expected position command are expected throttle plate position commands used by an electronic throttle control to control the position of a throttle plate in an internal combustion engine.

17. The input smoothing module of claim 16 wherein a system being controlled has a response time the selected interval for indexing the lookup table is scaled to the response time of the system being controlled.

18. The input smoothing module of claim 17 wherein the selected interval for indexing the lookup table is 5 milliseconds.

19. The input smoothing module of claim 15 wherein the selection means comprises:

means for selecting an index size of 1 in response to the delta position change being indicative of a angle greater than a first selected angle;

means for selecting an index size of 2 in response to the delta position change being indicative of an angle greater than a second selected angle and less than the first selected angle; and means for selecting an index size of 4 in response to the delta position change being indicative of an angle less than the second directed angle and greater than a third selected angle.

20. The input smoothing module of claim 19 wherein the programed microprocessor includes;

means for setting a smoothing enable flag in response to said delta position change being greater than a value indicative of the third selected angle; and means for disabling the smoothing enable flag in response to the completion of indexing through the lookup table.

21. The input smoothing module of claim 20 wherein the programed microprocessor includes means responsive to the smoothing flag being set to prohibit the selection of a new index size until the indexing of the lookup table has been completed.

22. The input smoothing module of claim 15 wherein the predetermined number of values in the lookup table is 16.

* * * * *